US005198825A

United States Patent [19]

Sakurai et al.

[11] Patent Number: 5,198,825

[45] Date of Patent: Mar. 30, 1993

[54] RECEPTION SYSTEM FOR A MOTOR VEHICLE

[75] Inventors: Kaoru Sakurai, Kawasaki; Harunori Murakami, Machida; Hiroshi Iijima, Yokohama; Masaru Maeda, Kawasaki; Koji Matsuda, Zama, all of Japan

[73] Assignee: Nippon Sheet Glass Co., Ltd., Doshomachi, Japan

[21] Appl. No.: 657,629

[22] Filed: Feb. 21, 1991

Related U.S. Application Data

[63] Continuation of Ser. No. 365,049, Jun. 9, 1989, abandoned.

[30] Foreign Application Priority Data

Jun. 10, 1988 [JP] Japan ............................ 63-77189[U]

[51] Int. Cl.[5] ..................... H01Q 1/320; H01Q 1/020; H01Q 1/500; H04B 1/180

[52] U.S. Cl. .................................... 343/713; 343/704; 343/850; 455/290

[58] Field of Search ............... 343/704, 713, 852, 860, 343/850, 851, 861, 862, 903; 455/144, 193, 290–292, 280; 333/167, 175, 174; 307/10.1

[56] References Cited

U.S. PATENT DOCUMENTS

| | | | |
|---|---|---|---|
| 3,702,968 | 11/1972 | Sawairi et al. | 455/144 |
| 4,352,207 | 9/1982 | Cross et al. | 455/290 |
| 4,403,347 | 9/1983 | Iso et al. | 455/193 |
| 4,422,077 | 12/1983 | Kropielnicki | 343/713 |
| 4,531,234 | 7/1985 | Bell | 455/143 |
| 4,584,544 | 4/1986 | Hettiger | 333/174 |
| 4,586,007 | 4/1986 | Ciszek | 333/175 |
| 4,757,277 | 7/1988 | Nakase et al. | 455/292 |
| 4,903,034 | 2/1990 | Kropielnicki et al. | 343/704 |
| 4,956,710 | 9/1990 | Pugel | 333/175 |

OTHER PUBLICATIONS

Remfry, H. C., Chapter 15 of the Electronics Engineer's Reference Book, F. F. Mazda, ed., pp. 15/1, 15/7–15/11, 1983.

*Primary Examiner*—Rolf Hille
*Assistant Examiner*—Peter Toby Brown
*Attorney, Agent, or Firm*—Jones, Day, Reavis & Pogue

[57] ABSTRACT

An inductance element is arranged to parallel resonate with a ground stray capacitance component of an antenna element on a motor vehicle and a feeder cable to a receiver. Matching means is provided to compensate for a Q-factor of the parallel resonance for improving a reception gain over a wide range in a reception band.

3 Claims, 8 Drawing Sheets

RECEPTION SYSTEM FOR A MOTOR VEHICLE

This is a continuation of application Ser. No. 07/365,049, filed Jun. 9, 1989, now abandoned.

BACKGROUND OF THE INVENTION

1. Field of the Invention

The present invention relates to a reception system for a motor vehicle and, more particularly, to a system using an antenna circuit having a large ground stray capacitance.

2. Description of the Prior Art

A defogging heater conductor is attached to a window glass, particularly to a rear window glass of a vehicle by baking or embedding. As is well known, the heater conductor is used as an antenna or a portion of an antenna element for an AM broadcast band.

FIG. 13 is a view showing a conductor pattern of a window glass antenna of this type. A large number of heater wires 2 are attached to a defogging region of a rear window glass 1, and power is fed through feeder buses 3 and 4 connected to one end of upper and lower groups of the heater wires and is returned through a junction bus 5 connected to the other end thereof. When the heater wires 2 are used as an AM broadcast reception antenna, a feeder 7 such as a coaxial cable is connected to a feed point 6 of the junction bus 5, and a reception signal is output to a tuner through a DC cut capacitor 8.

Heating currents flow in the feeder buses 3 and 4 through magnetically coupled choke coils 11*a* and 11*b* and feeders 12 and 13, respectively. The choke coil 11*a* connected to a main power supply +B and the choke coil 11*b* connected to the ground point are negatively coupled, so that magnetic flux due to the corresponding heating currents cancel each other in the cores, and small-volume cores can be used for operation in a non-saturated state. For a received high frequency wave, the choke coils 11*a* and 11*b* exhibit high impedances. Since a reception signal induced in the heater wires 2 is prevented from leaking to a low-impedance power supply or ground, reception efficiency is improved. Note that a line connected to the main power supply +B is connected to a decoupling capacitor 14, so that power supply noise is not mixed in the reception signal.

FIG. 14 is an equivalent circuit diagram of the antenna shown in FIG. 13. Reference symbol $e_0$ denotes an induction electromotive force of the heater wires 2; $C_1$, an active capacitance of the antenna; $C_2$, a reactive capacitance of the antenna; $C_3$, a stray capacitance (reactive capacitance) of the feeders 12 and 13, the feeder capable 7, and the like; $C_c$, a capacitance of the capacitor 8; R, an internal resistance of the antenna; and $L_x$, an inductance of the heater wire 2 and the choke coils 11*a* and 11*b*.

When an AM broadcast signal is received by the heater wires 2, the magnitude of the induction electromotive force $e_0$ depends on the size of the When the window glass area is small. The induction electromotive force $e_0$ is small.

The reactive capacitances $C_2$ and $C_3$ in the equivalent circuit diagram shown in FIG. 14 are not decreased in proportion as the window glass area is decreased. For this reason, when the window glass area is small, signal loss due to the reactive capacitances $C_2$ and $C_3$ is relatively increased. Accordingly, when a glass antenna with a small reception area is used, an AM broadcast signal cannot be received well.

SUMMARY OF THE INVENTION

It is a primary object of the invention to compensate for a reduction in gain due to reactive capacitances and to improve a reception sensitivity over a wide range.

According to an important aspect of this invention, a reception system for a motor vehicle comprises an antenna circuit including an antenna element for supplying a reception signal to a receiver; an inductance element connecting the antenna circuit to ground and constituting a parallel resonance circuit together with a ground stray capacitance of said antenna circuit at a frequency set in a reception band; and matching means associated with the parallel resonance circuit to compensate for a Q-factor of the parallel resonance so that a reception gain is improved over a wide range of reception frequencies.

The matching means preferably comprises an element being responsive to reception frequencies.

An impedance of the antenna circuit is increased in a reception band by parallel resonance, and a signal loss due to the ground stray capacitance can be reduced. The matching means compensates for Q-factor of the parallel resonance circuit increasing too much while matching the antenna circuit with the receiver. Reception sensitivity is improved over a wide range in a reception band.

BRIEF DESCRIPTION OF THE DRAWINGS

These and other objects, features, and advantages of the invention will become more apparent upon a reading of the following detailed specification and drawings, in which.

DETAILED DESCRIPTION OF THE PREFERRED EMBODIMENT.

Figure 1:
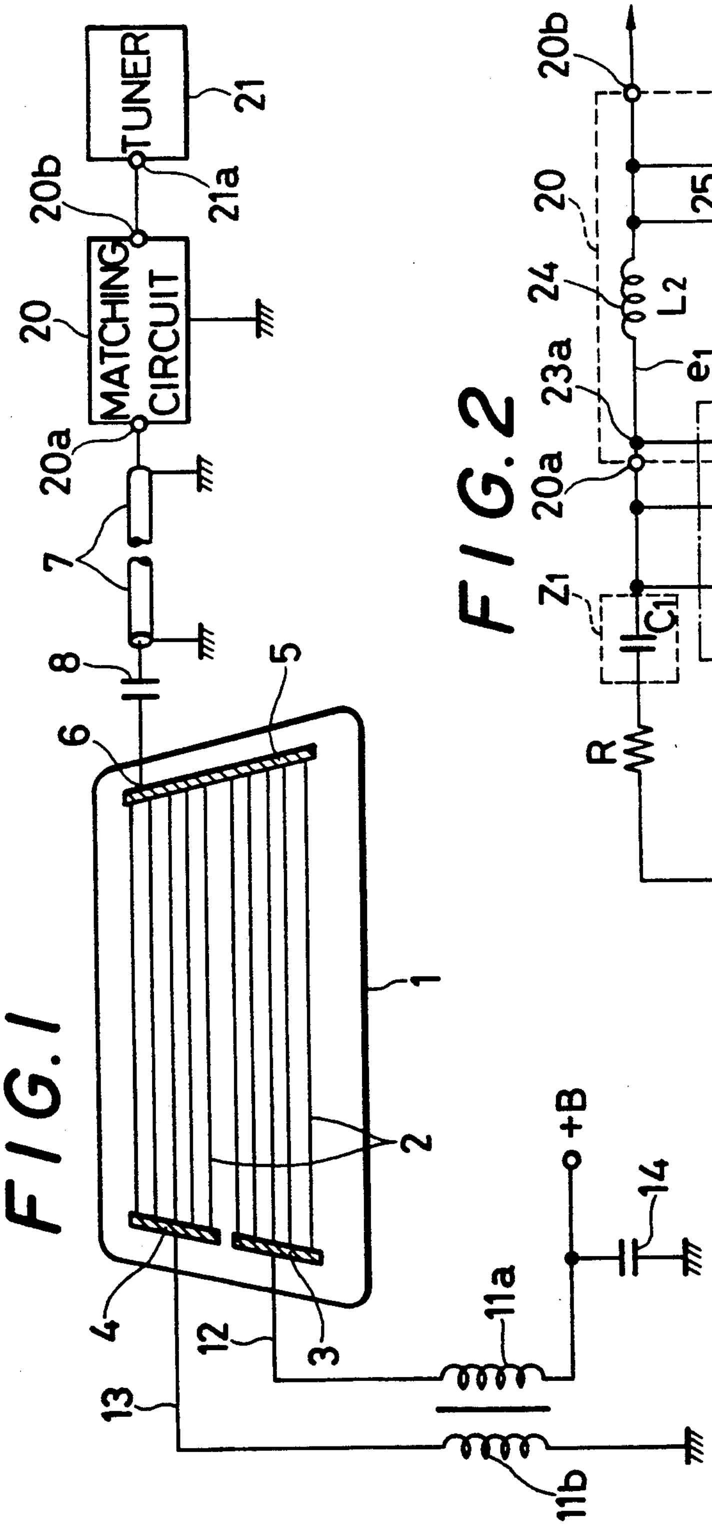
FIG. 1 is a diagram of a rear window glass antenna of a vehicle to which the first embodiment of the present invention is applied.
Figure 2:
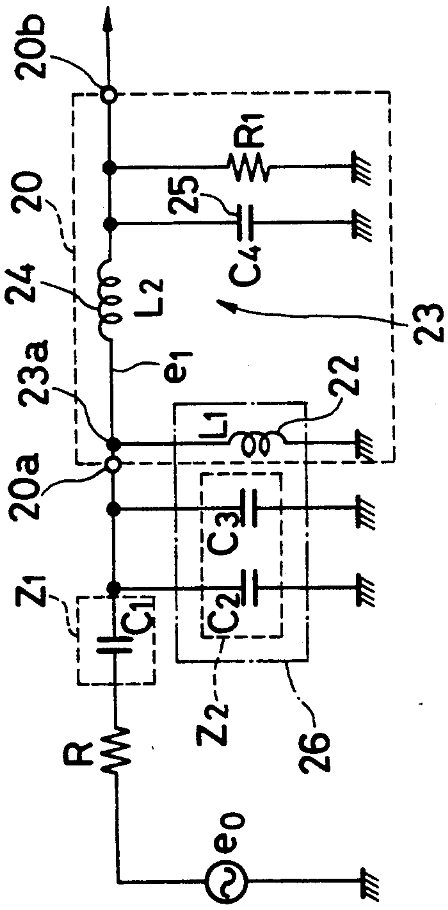
FIG. 2 is a circuit diagram of a matching circuit in FIG. 1.
Figure 13:
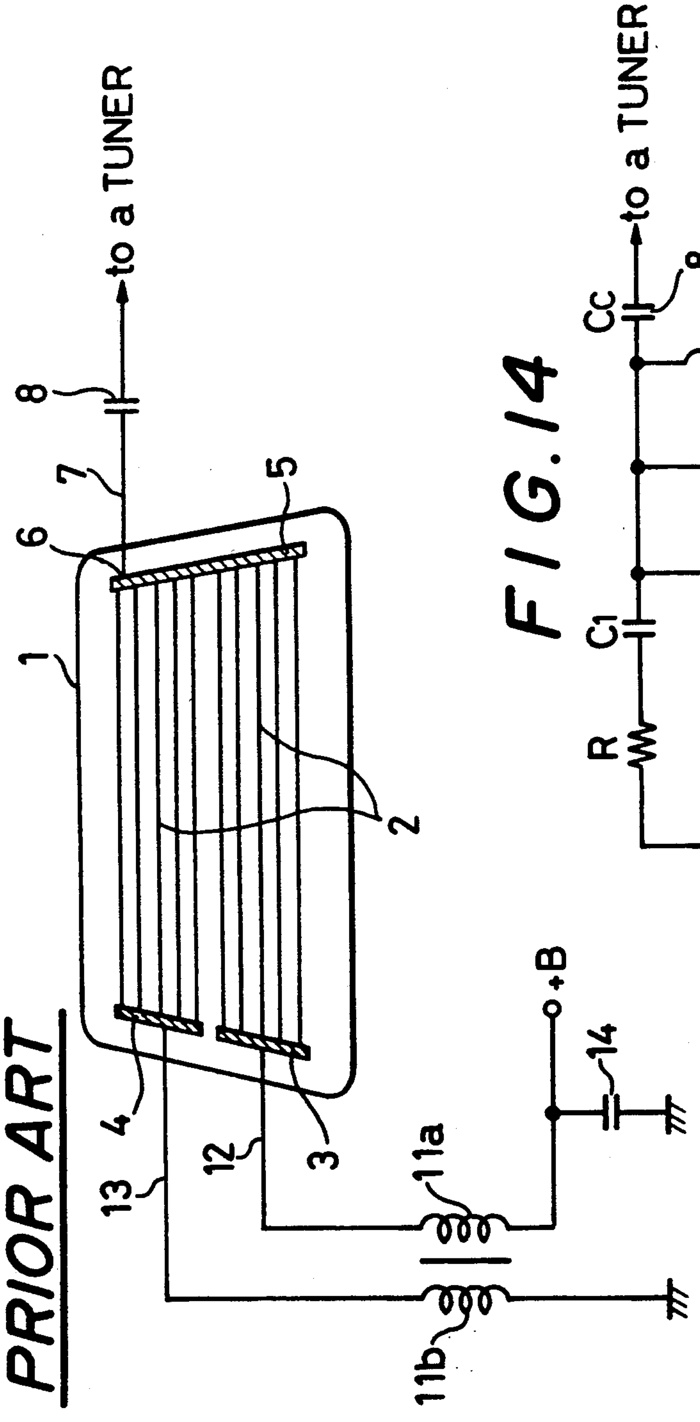
FIG. 13 PRIOR ART
FIG. 13 is a diagram of a conventional window glass antenna.
Figure 14:
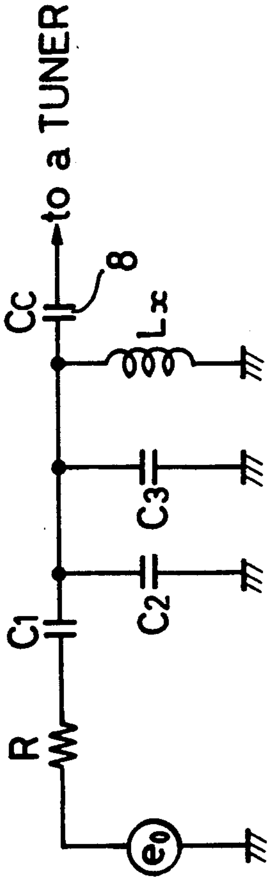
FIG. 14 is an equivalent circuit diagram of FIG. 13.

FIG. 1 is a diagram of a rear window glass antenna for a vehicle to which the present invention is applied, and FIG. 2 shows a circuit diagram of a matching circuit in FIG. 1. A conductor pattern of the rear window glass 1 and a feeder circuit of heating currents are the same as those in FIG. 13. In this first embodiment, a reception signal extracted through a DC cut capacitor 8 is supplied to an input terminal 21*a* of a tuner 21 via a 3- to 4-m long feeder cable 7 and a matching circuit 20.

As shown in FIG. 2, the matching circuit 20 comprises a resonance coil 22 and a low-pass filter 23. The resonance coil 22 is connected in parallel with stray capacitances $C_2$ and $C_3$ of the antenna circuit, and a parallel resonance circuit 26 is constituted by an inductance $L_1$ and reactive capacitances $C_2$ and $C_3$. The inductance element $L_1$ of the parallel resonance circuit 26 can include inductances, of choke coils 11*a* and 11*b* and the like, of a power supply circuit. When the inductances of the choke coils 11*a* and 11*b* are large, they can be ignored.

The low-pass filter 23 is constituted by a coil 24 series-connected between input and output terminals 20*a* and 20*b*, and a capacitor 25 parallel-connected between the output 20*b* and the ground. The inductance of the coil 24 is indicated by $L_2$, and the capacitance of the capacitor 25 is indicated by $C_4$. A damping resistor $R_1$ for widening a tuning frequency range is connected in parallel with the capacitor 25.

An output voltage $e_1$ of the antenna circuit supplied to the low-pass filter 23 is a value obtained by voltage-dividing the electromotive force induced in the heater wires 2 by an impedance $Z_1$ of the active capacitance $C_1$ and a parallel composite impedance $Z_2$ of the reactive capacitances $C_2$ and $C_3$. More specifically, $e_1$ is given by:

$$e_1 = \frac{e_0 Z_2}{Z_1 + Z_2} \quad (1)$$

As can be apparent from equation (1), if the impedance $Z_2$ of the reactive portion is increased, the output voltage $e_1$ can be increased.

In this embodiment, the resonance coil 22 is connected in parallel with the reactive capacitances $C_2$ and $c_3$, thus forming the parallel resonance circuit 26 in the reactive portion. Therefore, when the inductance $L_1$ of the resonance coil 22 is properly selected, the resonance circuit is parallel-resonated in the AM broadcast band, so that the impedance of the reactive portion, i.e., the impedance $Z_2$ in equation (1) can be an infinitely large value. As a result, the high output voltage $e_1$ can be obtained.

Supposing that the inductance $L_1$ is merely provided and parallel-resonated, the resonance circuit shows a high Q and operates in a narrow frequency band. Thus, reception sensitivity cannot be improved over a wide range. For this reason, in this embodiment, the reception power is fed to the input terminal 21*a* of the tuner 21 through the low-pass filter 23 for allowing a reception signal in the AM broadcast band to pass therethrough.

Since the unnecessary band other than the AM broadcast band is cut off by the low-pass filter 23, a noise level at the input terminal 21*a* of the tuner is decreased, and the sensitivity of the receiver is improved. When the resonance coil 22 is employed, the impedance of the antenna circuit is changed. In order to compensate for this change, in this embodiment, the low-pass filter is constituted by an L-match circuit, so that the output impedance of the antenna circuit is matched with the input impedance of the tuner. Therefore, a loss caused when power induced in the antenna is transmitted to the tuner 21 can be reduced, and the reception sensitivity can be improved over the entire AM broadcast band.

The impedance matching is achieved in the same manner as so-called noise matching so that an impedance viewed from the input terminal 21*a* of the tuner is matched with a point of the lowest noise factor.

Figure 3:
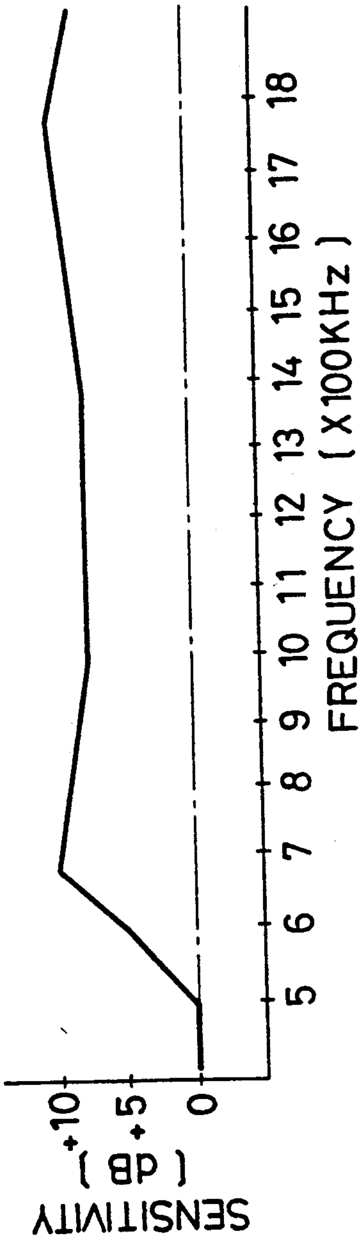
FIG. 3 is a graph showing frequency-sensitivity characteristics of a matching circuit using a dummy antenna.

FIG. 3 shows a graph confirming frequency characteristics by using the matching circuit 20 designed to have $L_1=150$ μH, $L_2=100$ μH, $C_4=30$ pF, and $R_1=2$ kΩ, and a dummy antenna having $R=5$ Ω, $C=150$ pF, and $C_2=65$ pF. The distributed capacitance $C_3$ of the cable and the like was 200 pF. In this graph, the reception sensitivity measured when the matching circuit 20 is removed is a reference value (0 dB). In the matching circuit 20, the parallel resonance circuit 26 resonates at a frequency of 700 to 800 kHz.

As can be apparent from FIG. 3, when the matching circuit 20 is employed the reception sensitivity of the AM broadcast band can be increased about 10 dB over a wide range. Since an increase in reception sensitivity is mainly obtained by canceling the reactive capacitances $C_2$ and $C_3$, the present device is particularly effective for a case wherein good reception sensitivity cannot be obtained due to loss caused by the reactive capacitances $C_2$ and $C_3$. Especially, when the present device is applied to cases where a reception signal is supplied from a small-area glass antenna or from a rear pole antenna through a long extended feeder cable to a tuner located at a front side, good reception sensitivity can be obtained over a wide range.

Figure 4:
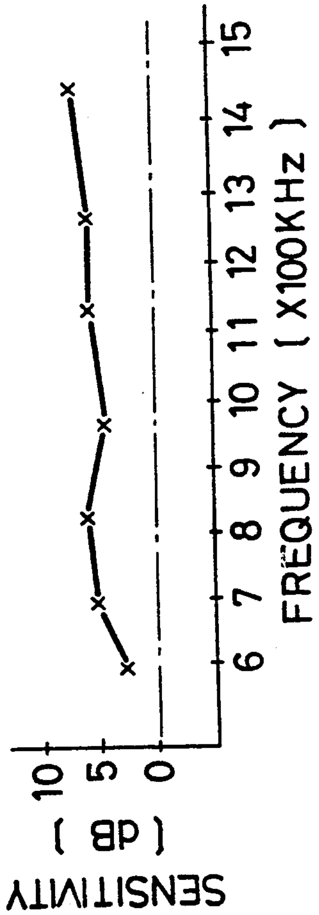
FIG. 4 is a graph showing frequency-sensitivity characteristics of a matching circuit in a test using an actual vehicle.

FIG. 4 is a graph showing sensitivity obtained when the matching circuit 20 of the embodiment is attached to an actual vehicle and an AM broadcast signal is received. In this graph, reception sensitivity measured when the matching circuit 20 is omitted also has a reference value, i.e., 0 dB. As can be seen from the graph, when the matching circuit 20 is employed, reception sensitivity can be improved over the wide AM broadcast band in an actual reception system.

If the inductances of the choke coils 11*a* and 11*b* are properly selected, they can be used as a resonance element, and the resonance coil 22 can be omitted. If the resonance coil 22 is omitted and the low-pass filter 23 is arranged in the tuner 21, the glass antenna and the tuner can be directly connected through the feeder cable 7 without insertion of any circuit.

Figure 5:
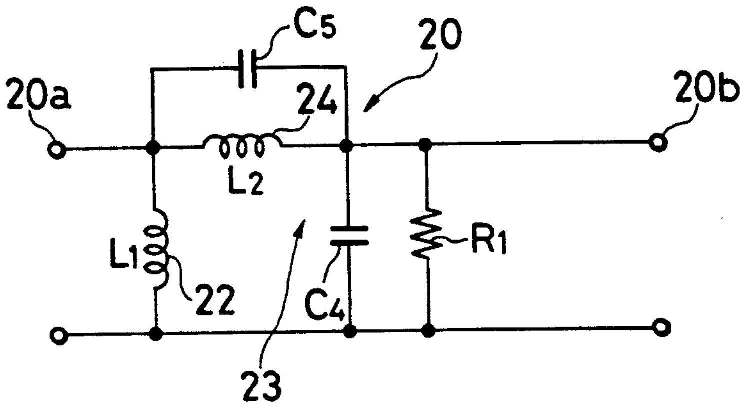
FIG. 5 is a circuit diagram showing a modification of the matching circuit.

When the antenna is used for both the AM and FM broadcast signals, an FM bypass capacitor $C_5$ (30 to 100 pF) is connected in parallel with the coil 24 of the low-pass filter 23 as shown in FIG. 5. Since FM broadcast is given at a frequency as high as 76 to 90 MHz, an FM reception signal passes through the bypass capacitor $C_5$ with small loss. Therefore, even if the low-pass filter 23 is arranged in the AM/FM antenna, the FM broadcast signal can be received.

As described above, according to the first embodiment, an inductance element which is parallel-resonated in a reception band with a capacitance to ground of the antenna as measured on the antenna side at the input terminal of a tuner is arranged, and a low-pass filter for allowing a signal in the reception band to pass therethrough is arranged between the output terminal of an antenna circuit and the input terminal of the tuner. Therefore, a ground impedance of the antenna viewed from the tuner is increased, so that a signal loss due to a capacitance to ground can be reduced. In addition, an unnecessary signal in a higher band can be cutoff to reduce a noise level, and the output impedance of the antenna circuit can be matched with the input impedance of the tuner so as to reduce power feed loss of reception power. Thus, power reception efficiency can be improved over a wide range.

When an inductance which is parallel-resonated with a reactive capacitance is merely added, Q is too high and a band of improved sensitivity is narrow. However, since the low-pass filter is used, a reduction in gain due to the ground stray capacitance can be compensated for over a wide range, and reception sensitivity of the antenna circuit including reactive capacitance can be improved over the entire reception band.

Figure 6:
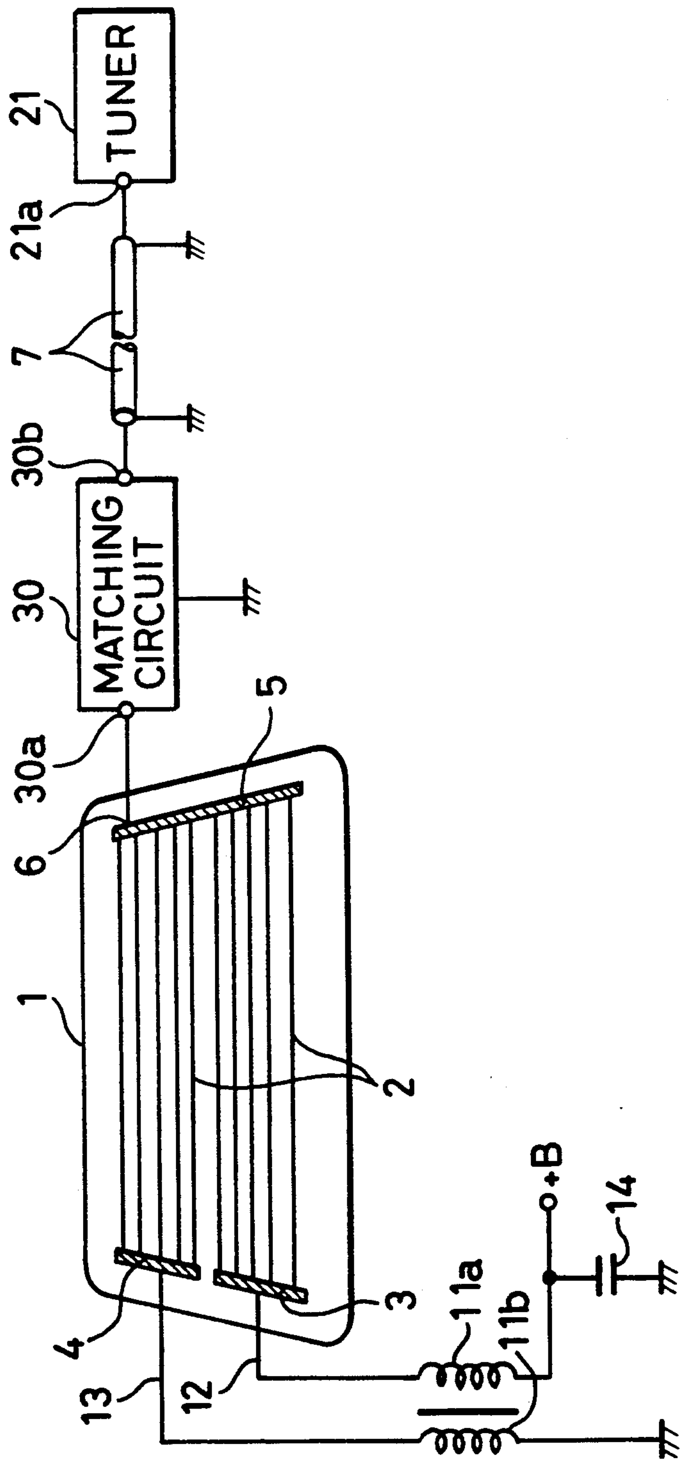
FIG. 6 is a diagram of a rear window glass antenna for a vehicle to which a second embodiment of the present invention is applied.
Figure 7:
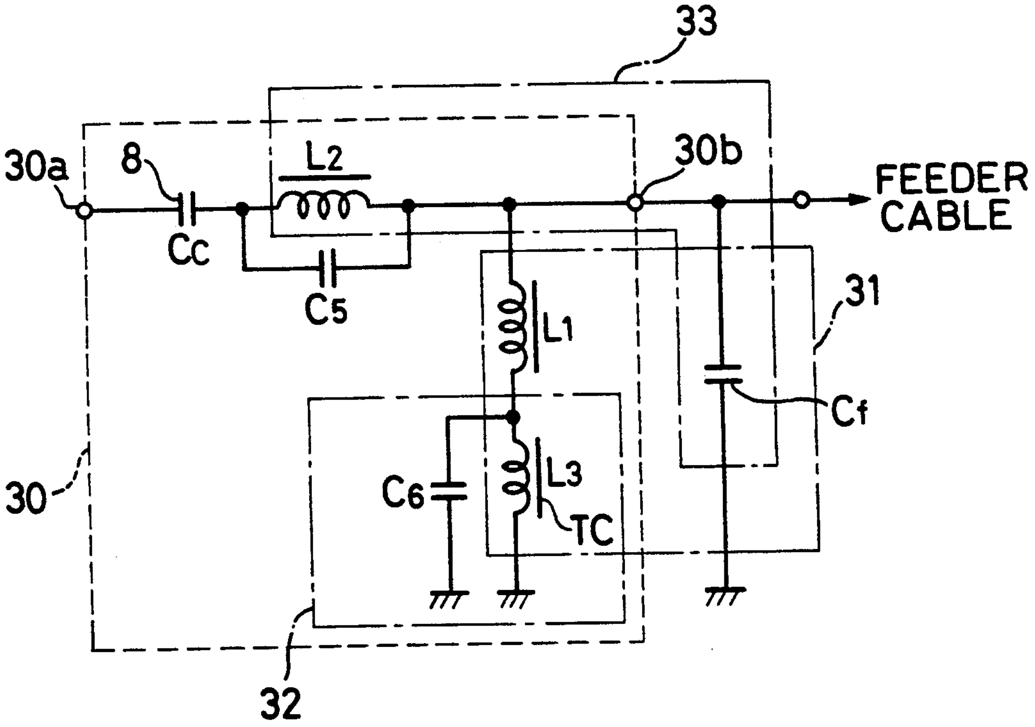
FIG. 7 is a circuit diagram of a matching circuit in FIG. 6.

FIG. 6 is a diagram of a rear window glass antenna for a vehicle according to a second embodiment of the invention. FIG. 7 is a circuit diagram of a matching circuit in FIG. 6. The conductor pattern of the rear window glass 1 and a supply circuit of heating currents are the same as those in FIG. 13. In this embodiment, a reception signal of heater wires 2 derived from a feed point 6 is supplied to a matching circuit 30, and an output from the matching circuit 30 is supplied to an input terminal 21*a* of a tuner 21 through a 3- to 4-m long feeder cable 7.

As shown in FIG. 7, a capacitor $C_c$ and a coil $L_2$ are connected in series with input and output terminals 30*a* and 30*b* of the matching circuit 30. The output side of the coil $L_2$ is grounded through a series circuit of coils $L_1$ and $L_3$.

The capacitor $C_c$ is a coupling capacitor (having a capacitance of, e.g., 1,000 pF) for extracting reception power induced in the heater wires 2. A reception signal whose DC component is cut by the capacitor $C_c$ is input to the coil $L_1$. The coil $L_2$ is arranged to improve reception sensitivity in a high-frequency range of the AM broadcast band. The coil $L_2$ and a reactive capacitance $C_f$ constitute a low-pass filter to be described later. The reactive capacitance $C_f$ between the output terminal 30*b* and ground represents a ground stray capacitance of the feeder cable 7. A capacitor $C_5$ connected in parallel with the coil $L_2$ is a bypass capacitor (having a capacitance of, e.g., 68 pF) for allowing a reception signal in the FM broadcast band to pass with a small loss, and is connected when the heater wires 2 (antenna) are used for both AM and FM broadcast signals.

The series circuit of the coils $L_1$ and $L_3$ and the reactive capacitance $C_f$ form a first parallel resonance circuit 31. When the parallel resonance circuit 31 is parallel-resonated, a reactive component can be canceled to improve power reception efficiency. When a 4-m long feeder cable 7 having a distributed capacitance of 30 pF/m is used, the reactive capacitance $C_f$ is about 120 pF. In this case, the inductance of the coil $L_2$ is 180 $\mu$H, and the inductance of the coil $L_3$ is 140 $\mu$H as a nominal value. The inductance of the coil $L_3$ has frequency characteristics, as will be described later.

Figure 8:
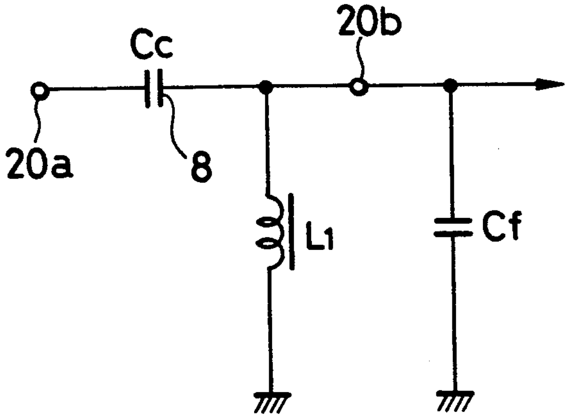
FIG. 8 PRIOR ART
FIG. 8 is a circuit diagram of a single parallel resonance circuit found in the prior art.
Figure 9:
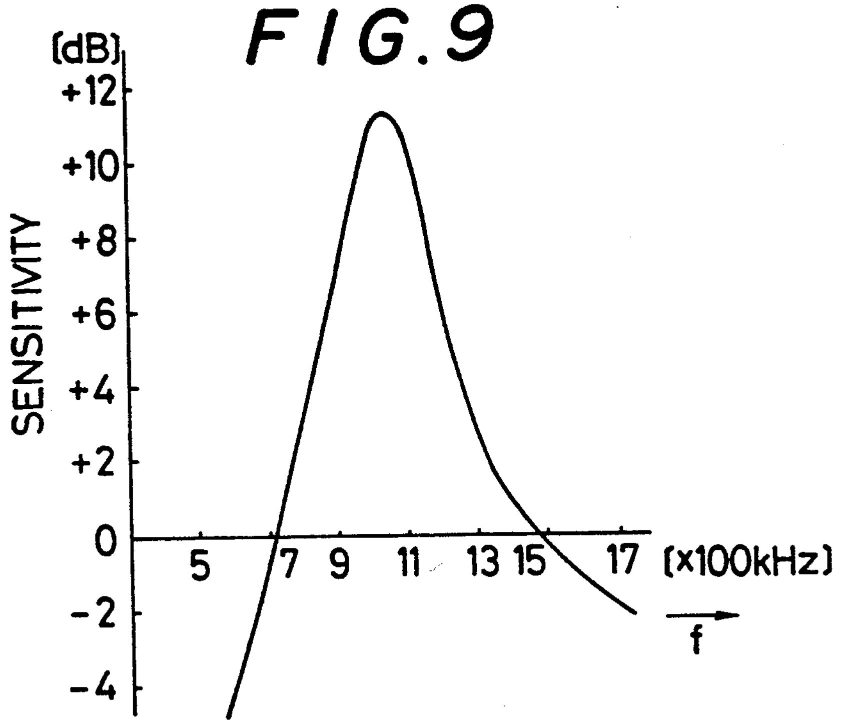
FIG. 9 is a graph showing reception sensitivity-frequency characteristics when the parallel resonance circuit shown in FIG. 8 is used.

As shown in a prior art circuit diagram of FIG. 8, when only the coil $L_1$ of the fixed inductance is connected in parallel with the reactive capacitance $C_f$, the reception band becomes very narrow, and sensitive in a range of 800 to 1,300 kHz, as shown in the frequency characteristic graph of reception sensitivity in FIG. 9.

Figure 10:
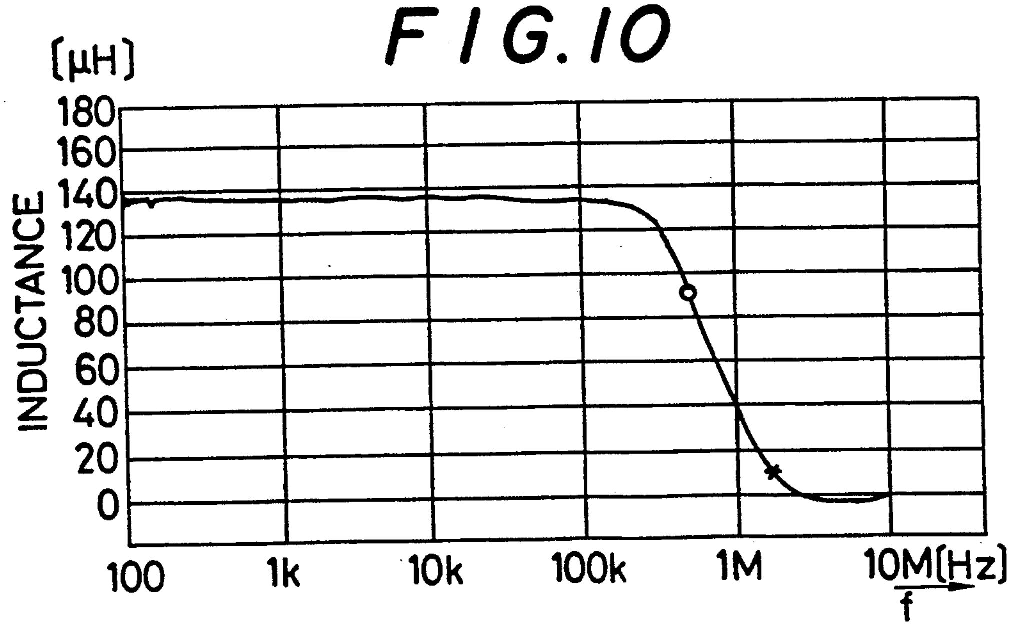
FIG. 10 is a graph showing inductance-frequency characteristics of a coil used in the embodiment shown in FIG. 7.

In order to obtain wide-range reception characteristics, the coil $L_3$ connected in series with the coil $L_1$ is provided with inductance-frequency characteristics shown in FIG. 10. More specifically, in a low frequency range up to 200 kHz, the inductance is substantially constant, i.e., about 140 $\mu$H, and in a frequency range higher than 200 kHz, the inductance is steeply decreased as the frequency is increased. In an AM reception band between points o and x, the inductance is 95 $\mu$H at 500 kHz, and is 10 $\mu$H at 1,500 kHz.

The coil $L_3$ is formed by winding a wire having a diameter of 0.4 mm seven turns around a toroidal core TC having a high permeability ($\mu$=5,000).

Therefore, a total inductance $L_1+L_3$ of the first parallel resonance circuit 31 is decreased from 275 $\mu$H to 190 $\mu$H in a reception band from 500 kHz to 1,500 kHz. For this reason, a resonant point of the first parallel resonance circuit 31 is shifted toward a high-frequency range along with an increase in frequency of a reception signal. Therefore, the first resonance circuit 31 can have wider-range frequency characteristics.

Furthermore, in order to improve reception sensitivity in a low-frequency range, a capacitor $C_6$ is connected in parallel with the coil $L_3$ to constitute a second resonance circuit 32. The capacitance of the capacitor $C_6$ is adjusted in correspondence with the reactive capacitance $C_f$, and the second parallel resonance circuit 32 is resonated near 800 kHz in a low-frequency range. The capacitance of the capacitor $C_6$ is set to be about 280 pF when the reactive capacitance $C_f$= 120 pF.

Figure 11:
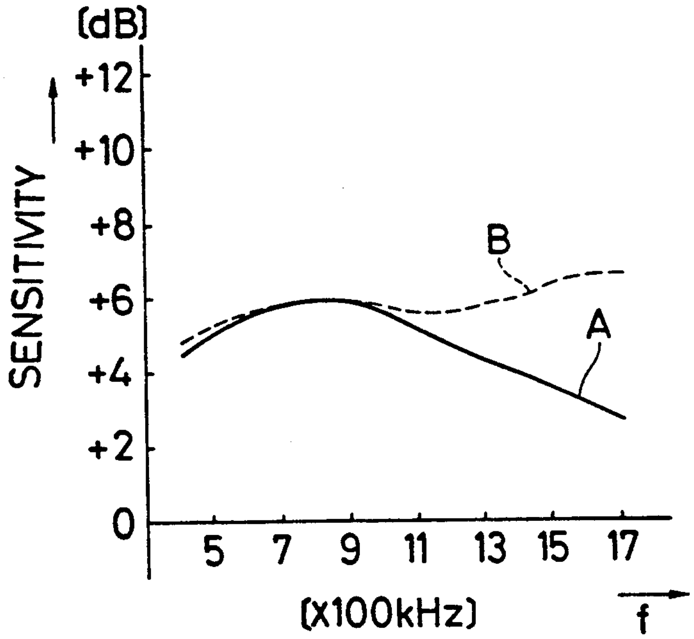
FIG. 11 is a graph showing reception sensitivity-frequency characteristics obtained when the matching circuit shown in FIG. 7 is used.

As described above, the first parallel resonance circuit 31 is parallel-resonated in middle- and high-frequency ranges of the reception band, and the second parallel resonance circuit 32 is parallel-resonated in a low-frequency range of the reception band. As a result, as indicated by a characteristic curve A of the reception sensitivity graph of FIG. 11, good reception performance can be obtained over a very wide range. The characteristics A are obtained when a series coil $L_2$ to be described below is omitted.

In order to further improve reception sensitivity in a high-frequency range, the coil $L_2$ for forming the low-pass filter 33 together with the reactive capacitance $C_f$ is employed. If the inductance of the coil $L_2$ is about 47 $\mu$H, it causes a kind of resonance at about 2 MHz with the reactive capacitance $C_f$ of 120 pF. As indicated by a characteristic curve B indicated by a broken curve B in FIG. 11, sensitivity in middle- and high-frequency ranges of the reception band is improved.

The matching circuit 30 in FIG. 6 is inserted at an end of the feeder cable 7 on the side of window glass 1. The matching circuit 30 may be inserted at an end of the feeder cable 7 on the side of the tuner 21 as in the embodiment of FIG. 1. Antenna and the matching circuit 30 are coupled through the feeder cable 7. In this arrangement, the reactive capacitance may consist of a stray capacitance to ground for the glass antenna comprising the heater wires 2 and a stray capacitance to ground for the cable 7, both coupled in parallel.

The matching circuit 30 may be incorporated in the tuner 21. The capacitor $C_5$ for bypassing an FM reception signal can be omitted when the matching circuit 30 is employed in an AM tuner.

Figure 12:
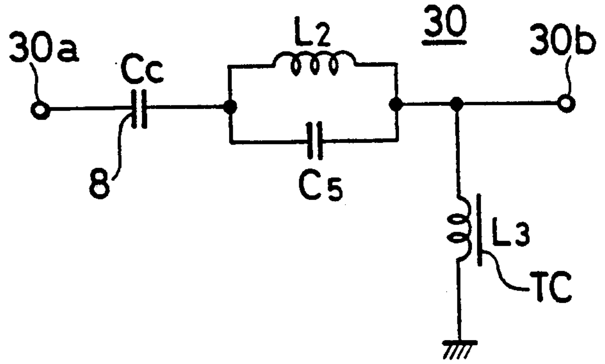
FIG. 12 is a circuit diagram of a modification of the matching circuit which is inserted after a feeder cable.

FIG. 12 is a modification of the matching circuit 30 in which the coil $L_1$ is removed by preferably adjusting the inductance value of coil $L_3$ and permeability of a toroidal core TC for the coil $L_3$. A similar function as that for FIG. 7 is effective for this arrangement. For example, a core material having permeability $\mu$ as large as 2,500 to 8,000 may be applied to the coil $L_3$ in the case where a 3- to 4-m long feeder cable 7 having a reactive capacitance $C_f$ of about 120 pF is used. The coil $L_3$ is wound on the core to have an inductance of 850 $\mu$H at 500 kHz and 75 $\mu$H at 1,700 kHz. A series coil $L_2$ and a capacitor $C_5$ in parallel therewith may be provided.

According to the second embodiment as described above, a resonance coil whose inductance is decreased along with an increase in reception frequency is arranged in parallel with a ground stray capacitance value at an input terminal of a tuner on an antenna side, and is parallel-resonated in a reception band. For this reason, if a constant inductance which is parallel-resonated with the reactive capacitance is merely employed, Q is too high and a band is narrow. However, when the inductance is provided with frequency characteristics in a reception band, the resonance frequency changes in correspondence with a reception frequency, and a reduction in gain due to ground stray capacitance can be compensated for over a wide range. Therefore, reception sensitivity of an antenna circuit having a large reactive capacitance can be improved over the entire reception band.

What is claimed is:

1. A reception system for a motor vehicle comprising an antenna circuit including an antenna element, a matching circuit having an input connected to the antenna element and a feeder cable connected to an output of said matching circuit for supplying a reception signal to a receiver, wherein said matching circuit comprises:

a series circuit consisting of first and third coils, connected between said output of said matching circuit and ground to form a parallel resonance circuit together with a ground stray capacitance of said feeder cable at a frequency set in a specific band assigned to said receiver;

a second coil connected between the input and output of said matching circuit for forming a low-pass filter together with the ground stray capacitance of said feeder cable;

said third coil having a core member inserted therein, the permeability of the core member having a characteristic curve descending with increase of frequency between lower and upper ends of said specific reception band so that the resonant frequency of said parallel resonance circuit increases as the reception frequency increases to lower a Q-factor of the parallel resonance circuit for widening the reception frequency band in which the reception system shows good reception sensitivity; and, a second parallel resonance circuit comprising a capacitor connected between ground and the junction between said first and third coils, said second parallel resonance circuit being set to resonate at a frequency location on a lower side of the reception band.

2. A reception system according to claim 1, wherein said antenna element comprises defogging heater conductors arranged on a rear window glass of a motor vehicle, and wherein a pair of choke coils is inserted in a pair of power feed lines for feeding a heating current to said heater conductors.

3. A reception system for a motor vehicle according to claim 1, wherein said parallel resonance circuit and said matching circuit cooperate to operate effectively in an AM broadcast band, and further comprising another capacitor being connected between said input and output of said matching circuit to provide a bypass for an FM reception signal.

* * * * *